US006467248B2

(12) United States Patent
Brown

(10) Patent No.: US 6,467,248 B2
(45) Date of Patent: Oct. 22, 2002

(54) METHOD FOR PROCESSING FRESHLY HARVESTED LEAFY VEGETABLES AND SUBDIVIDED, PEELED FRUIT

(75) Inventor: Richard S. Brown, Chualar, CA (US)

(73) Assignee: Fresh Express, Inc., Salinas, CA (US)

( * ) Notice: Subject to any disclaimer, the term of this patent is extended or adjusted under 35 U.S.C. 154(b) by 0 days.

(21) Appl. No.: 09/507,503

(22) Filed: Feb. 18, 2000

(65) Prior Publication Data

US 2002/0104302 A1 Aug. 8, 2002

(51) Int. Cl.$^7$ .............................................. A01D 45/00
(52) U.S. Cl. ...................................... 56/327.1; 426/482
(58) Field of Search ............................ 56/16.5, 164 R, 56/327.1, 328.1; 134/25.3; 426/484, 506, 482, 489, 519, 809

(56) References Cited

U.S. PATENT DOCUMENTS

| 910,882 A | 1/1909 | Truesdell |
| 1,661,602 A | 3/1928 | Dary |
| 2,003,326 A | 6/1935 | Wellman |
| 2,170,378 A | 8/1939 | Orstrom |
| 2,214,944 A | 9/1940 | Vogt |
| 2,294,668 A | 9/1942 | Karas |
| 2,335,913 A | 12/1943 | Buttery |
| 2,424,693 A | 7/1947 | Jones |
| 2,611,709 A | 9/1952 | Plagge |
| 2,627,862 A | 2/1953 | Flusher |
| 2,815,621 A | 12/1957 | Carter |
| 2,920,967 A | 1/1960 | Heinemann |
| 2,925,210 A | 2/1960 | Fallert |
| 2,955,940 A | 10/1960 | Williams |
| 2,967,777 A | 1/1961 | Grindrod |
| 3,055,568 A | 1/1962 | Zalking |
| 3,128,934 A | 4/1964 | Jacke |
| 3,203,437 A | 8/1965 | Faust |
| 3,204,825 A | 9/1965 | Underwood |
| 3,220,157 A | 11/1965 | Buchner |
| 3,261,533 A | 7/1966 | Ripking |
| 3,407,078 A | 10/1968 | Schlichter |
| 3,419,400 A | 12/1968 | Hayhurst et al. |
| 3,450,542 A | 6/1969 | Badran |
| 3,473,589 A | 10/1969 | Gotz |
| 3,484,017 A | 12/1969 | O'Donnell |
| 3,521,806 A | 7/1970 | Esty |
| 3,715,860 A | 2/1973 | Esty |
| 3,747,614 A | 7/1973 | Buedingen |
| 3,939,287 A | 2/1976 | Orwig et al. |
| 3,945,558 A | 3/1976 | Elder |
| 3,957,179 A | 5/1976 | Bamburg et al. |
| 3,990,358 A | 11/1976 | Cade |
| 3,991,543 A | 11/1976 | Shaw |
| 4,001,443 A | 1/1977 | Dave |
| 4,006,561 A | 2/1977 | Toma et al. |
| 4,039,350 A | 8/1977 | Bucy |
| 4,055,931 A | 11/1977 | Myers |
| 4,061,785 A | 12/1977 | Nishino et al. |
| 4,066,401 A | 1/1978 | Solomon |
| 4,079,152 A | 3/1978 | Bedrosian et al. |
| 4,089,417 A | 5/1978 | Osborne |
| 4,105,153 A | 8/1978 | Locke |
| 4,168,597 A | 9/1979 | Cayton |
| 4,209,538 A | 6/1980 | Woodruff |
| 4,224,347 A | 9/1980 | Woodruff |
| 4,241,558 A | 12/1980 | Gidewall et al. |
| 4,258,848 A | 3/1981 | Akao et al. |
| 4,268,555 A | 5/1981 | Kantz |
| 4,296,860 A | 10/1981 | Hsu et al. |
| 4,343,429 A | 8/1982 | Cherry |
| 4,411,921 A | 10/1983 | Woodruff |
| 4,422,466 A | 12/1983 | Schafer |
| 4,423,080 A | 12/1983 | Bedrosian et al. |
| 4,454,945 A | 6/1984 | Jabarin |
| 4,515,266 A | 5/1985 | Myers |
| 4,516,692 A | 5/1985 | Croley |
| 4,610,885 A | 9/1986 | Tait |
| 4,670,227 A | 6/1987 | Smith |
| 4,702,408 A | 10/1987 | Powlenko |
| 4,744,199 A | 5/1988 | Gannon |
| 4,744,203 A | 5/1988 | Brockwell et al. |
| 4,756,417 A | 7/1988 | Teixeira |
| 4,759,642 A | 7/1988 | Van Erden et al. |

(List continued on next page.)

FOREIGN PATENT DOCUMENTS

| CA | 1025786 | 2/1978 |
| DE | 2842204 | 4/1980 |
| EP | 0253434 | 1/1988 |
| GB | 402436 | 12/1933 |
| GB | 764796 | 1/1957 |
| GB | 1378140 | 12/1974 |
| JP | 60-126032 | 7/1985 |

OTHER PUBLICATIONS

Wiley Encyclopedia of Packaging Technology J. Wiley & Sons, 1986 pp. 24–29, 66–81.

Packaging, Japan, Nov. 198, pp.17–22, No date.

Chemical Engineering, vol. 64, No date.

Modern Packaging, Aug. 1941, pp. 44, 45.

"The King PAK" eight sided fiberboard IBC from Packaging Review, May 1980, 1 page.

The Wiley Encyclopedia of Packaging Technology (WFPT), John Wiley & Sons, 1986, p. 493.

*Primary Examiner*—Robert E. Pezzuto
*Assistant Examiner*—Árpád Fábián Kovács
(74) *Attorney, Agent, or Firm*—Patrick F. Bright

(57) ABSTRACT

Methods for processing freshly harvested leafy produce, fruits and vegetables comprising cutting such produce, fruits and vegetables from their growth sites, removing the cores of the produce as necessary, positioning the produce, fruits and vegetables to allow their natural juices to exude from the cutting and coring sites for a time sufficient to permit substantially all the free-flowing natural juices at or near such sites to exude, and then washing the coring site to remove the exuded natural juices.

9 Claims, No Drawings

U.S. PATENT DOCUMENTS

| | | | |
|---|---|---|---|
| 4,813,791 A | 3/1989 | Cullen et al. | |
| 4,840,271 A | 6/1989 | Garwood | |
| 4,863,287 A | 9/1989 | Marisk | |
| 4,886,372 A | 12/1989 | Greengrass et al. | |
| 4,930,906 A | 6/1990 | Hemphill | |
| 4,962,777 A | 10/1990 | Bell | |
| 4,963,287 A | 10/1990 | Hutchings et al. | |
| 4,967,776 A | 11/1990 | Folmar | |
| 5,044,776 A | 9/1991 | Schramer et al. | |
| 5,078,509 A | 1/1992 | Center et al. | |
| 5,093,080 A | 3/1992 | Keller | |
| 5,121,589 A | 6/1992 | Ventura et al. | |
| 5,126,153 A * | 6/1992 | Beck | 426/269 |
| 5,196,222 A * | 3/1993 | Kirk | 426/482 |
| 5,226,972 A | 7/1993 | Bell | |
| 5,290,580 A | 3/1994 | Floyd et al. | |
| 5,316,778 A | 5/1994 | Hougham | |
| 5,346,089 A | 9/1994 | Brown et al. | |
| 5,354,569 A | 10/1994 | Brown et al. | |
| 5,402,906 A | 4/1995 | Brown et al. | |
| 5,421,250 A | 6/1995 | Beaumont | |
| 5,437,731 A | 8/1995 | St. Martin | |
| 5,522,410 A | 6/1996 | Meilleur | |
| 5,640,643 A | 6/1997 | Hoitz et al. | |
| 5,713,101 A | 2/1998 | Jackson | |
| 5,727,690 A | 3/1998 | Hofmeister | |
| 5,728,439 A | 3/1998 | Carlblom et al. | |
| 5,817,360 A * | 10/1998 | Pao et al. | 426/482 |
| 5,885,002 A | 3/1999 | Reiss | |
| 5,954,067 A * | 9/1999 | Brown et al. | 134/25.3 |
| 6,041,797 A | 3/2000 | Casselman | |
| 6,189,299 B1 * | 2/2001 | Brown et al. | 53/512 |
| 6,196,237 B1 * | 3/2001 | Brown et al. | 134/25.3 |

* cited by examiner

METHOD FOR PROCESSING FRESHLY HARVESTED LEAFY VEGETABLES AND SUBDIVIDED, PEELED FRUIT

SUMMARY OF THE INVENTION

This invention relates to methods for processing freshly harvested vegetables such as lettuce, particularly Iceberg lettuce. The method includes the steps of cutting the core from freshly harvested vegetables such as lettuce and particularly Iceberg and Romaine lettuce, allowing natural juices such as sap or latex to exude from the cored site after cutting, such that substantially all of the natural free-flowing juices at this site exude from the site, then washing the site to remove the exuded matter.

DESCRIPTION OF THE PREFERRED EMBODIMENT

These methods are also applicable, after harvesting, to subdivided, peeled fruit such as apples, grapefruit, oranges, limes, and lemons and vegetables and other produce such as potatoes in the form of french fries, carrots in the form of slices or sticks, celery in the form of slices or sticks, and members of the chicory family e.g. endive, escarole and radicchio.

In preferred embodiments, the methods are applied to fresh vegetables such as lettuce, particularly head lettuce such as Iceberg lettuce or Romaine lettuce. After coring, the lettuce is positioned to allow its natural juices to flow, by gravity or otherwise, from the coring site, and then washed at and around the coring site to remove exuded natural juices and other entrained matter. Preferably, the positioning period is in the range of about fifteen seconds to about sixty minutes.

Methods for processing fresh produce comprise cutting the produce from its growth site, removing the core of the produce, positioning the cored produce to allow its natural juices to exude from the coring site for a time sufficient (e.g. a time period in a range of about 15 seconds to about 60 minutes) to permit substantially all such free-flowing juices at or near the coring site to exude from the site, and washing the cored produce to remove such exuded natural juices from produce surfaces. These methods may also comprise selecting, as the fresh produce, lettuce such as Iceberg lettuce or Romaine lettuce.

The methods for processing freshly harvested fruits and vegetables include cutting such fruits and vegetables from their growth sites, peeling, cutting (or peeling and cutting) the fruits and vegetables, positioning the fruits and vegetables to allow their natural juices to exude substantially completely from the cutting sites, and washing the fruits and vegetables to remove the exuded natural juices. Such fruits and vegetables may be, for example, celery, grapefruit, orange, lemon and lime. In some cases, the fruits and vegetables may be subjected to cutting or slicing before the positioning step, particularly where the produce is, for example, potatoes and carrots.

EXAMPLE 1

After field harvesting and coring of Romaine lettuce heads, the coring site on each head was washed immediately and the cored, washed lettuce heads placed in containers for further processing. After placement in these containers, the coring sites continued to exude natural juices such as sap and latex containing, among other things, the enzyme polyphenol oxydase (PPO). Upon exposure to air, these natural juices remained on the Romaine heads, turned brown in color, and could not easily be removed by washing.

By contrast, harvested, cored Romaine lettuce heads positioned to permit natural juices to exude from the coring site for one hundred twenty seconds, i.e. about two minutes, before washing to remove exuded material, had substantially no brown spots at or near the coring site.

EXAMPLE 2

After heads of Romaine lettuce were cut from the soil, the outer leaves were removed and discarded, leaving only the undamaged leaves. The top portions of these leaves were trimmed in the field to remove brown and/or dried leaf tips. In some cases, this trimming removed less than one inch; in other cases, three inches or more. The core stem of each lettuce head was then cut away. After core removal, the lettuce heads were positioned so that sap, latex and other free-flowing natural juices exuded from the coring site for a time up to about two minutes. Thereafter, these lettuce heads were washed to remove all visible sap and other natural juices. The heads were then placed onto a conveyor belt, and moved into a container for transport. These containers included an inner, sanitary plastic liner bag.

What is claimed:

1. A method for commercial processing of fresh produce comprising: harvesting said produce by cutting said produce from its growth site in the field; removing the core of said produce in the field; positioning a plurality of said cored produce to allow their natural juices to exude from the coring sites for a time sufficient to permit substantially all such free-flowing juices at or near the coring sites to exude from said sites; and then washing said cored produce to remove such exuded natural juices from the surfaces of said cored produce before packaging said produce for commercial distribution.

2. The method of claim 1 further comprising selecting, as said fresh produce, lettuce.

3. The method of claim 1 further comprising selecting, as said fresh produce, Iceberg lettuce or Romaine lettuce.

4. The method of claim 1 further comprising sustaining said positioning for a time period in the range of about fifteen seconds to about sixty minutes.

5. The method of claim 2 further comprising sustaining said positioning for a time period in the range of about fifteen seconds to about sixty minutes.

6. The method of claim 3 further comprising sustaining said positioning for a time period in the range of about fifteen seconds to about sixty minutes.

7. A method for commercially processing freshly harvested fruits and vegetables comprising cutting said fruits and vegetables from their growth sites in the field; peeling, cutting, or peeling and cutting said fruit and vegetables; positioning a plurality of said fruits and vegetables to allow their natural juices to exude substantially completely from the field cutting sites; and washing said fruits and vegetables to remove said exuded natural juices before packaging said fruits and vegetables for commercial distribution.

8. The method of claim 7 wherein said fruits or vegetables are selected from the group consisting of celery, grapefruit, orange, lemon, and lime.

9. The method of claim 7 wherein said fruits and vegetables are subjected to cutting or slicing before said positioning step, and said produce is selected from the group consisting of potatoes and carrots.

* * * * *